United States Patent
Nakazato

[19]

[11] Patent Number: 5,977,736
[45] Date of Patent: Nov. 2, 1999

[54] SUPERPOSITION CONTROL METHOD USING NUMERICAL CONTROLLER

[75] Inventor: Tomomi Nakazato, Kawasaki, Japan

[73] Assignee: Fanuc Limited, Yamanashi, Japan

[21] Appl. No.: 09/029,289

[22] Filed: Mar. 6, 1998

[30] Foreign Application Priority Data

Jul. 10, 1996 [JP] Japan ................................. 8-198551

[51] Int. Cl.$^6$ ............................................. B25J 9/10
[52] U.S. Cl. .................................. 318/568.17; 318/590
[58] Field of Search .................................. 318/569, 590, 318/574, 594, 568.17, 592, 593

[56] References Cited

U.S. PATENT DOCUMENTS

| 4,652,804 | 3/1987 | Kawamura et al. | 318/590 |
| 4,949,025 | 8/1990 | Iwagaya et al. | 318/569 |
| 5,233,276 | 8/1993 | Gleim | 318/368 |

FOREIGN PATENT DOCUMENTS 2-181203  7/1990  Japan .

*Primary Examiner*—Jonathan Salata
*Attorney, Agent, or Firm*—Staas & Halsey

[57] ABSTRACT

A superimposing control method using a numerical control device, capable of starting and terminating a superimposing control even during movement, without the need of waiting for the adjustment of timing and without rapid acceleration or deceleration. In response to a superimposition command, a motion value distributed to a Z axis of a superimposing axis in a reference system is subjected to acceleration/deceleration processing by an acceleration/deceleration processing section separately provided for superimposition, and the obtained movement value is added to a motion command value for a Z axis of a superimposed axis in a superimposing system. When a superimposition termination command is issued, the motion command value remained in the acceleration/deceleration processing section for superimposition is superimposed on the motion command value for the Z axis of the superimposing system. The superimposition can be smoothly started and terminated without the need to stop the two control systems.

20 Claims, 5 Drawing Sheets

SUPERPOSITION CONTROL METHOD USING NUMERICAL CONTROLLER

BACKGROUND OF THE INVENTION

The present invention relates to a superimposing control method for a machine tool, in which a plurality of control systems are controlled by a computerized numerical control (CNC) device.

There is already known a superimposing control method in which motion of an arbitrary axis in one control system is superimposed on motion of an axis in another control system, to thereby control the axis of the latter control system, in a machine tool controlled by a numerical control device having multiple control systems.

Figure 2:
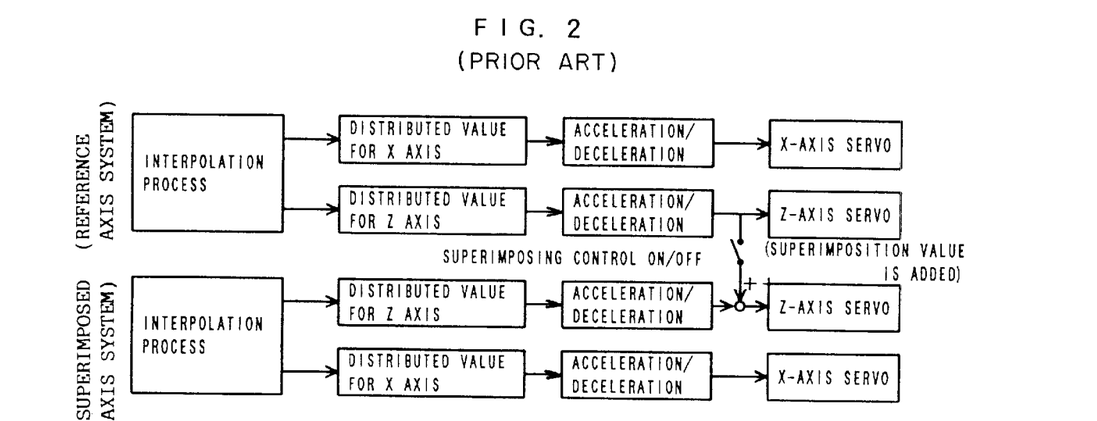
FIG. 2 (PRIOR ART) is a block diagram showing the principle of a conventional superimposing control method.

FIG. 2 (PRIOR ART) is a block diagram showing the principle of a conventional superimposing control for a lathe having two control systems. Two control systems are provided with each having feed shafts for X and Z axes and such that each are controlled independently of each other. Interpolation processing for a motion command is performed based on a machining program for each control system, and after the motion command values to be distributed to X and Z axes are respectively subjected to acceleration/deceleration processing, they are output to respective servomotors for the axes, so that the X and Z axes of each of the control systems are controlled independently of each another.

Figure 3:
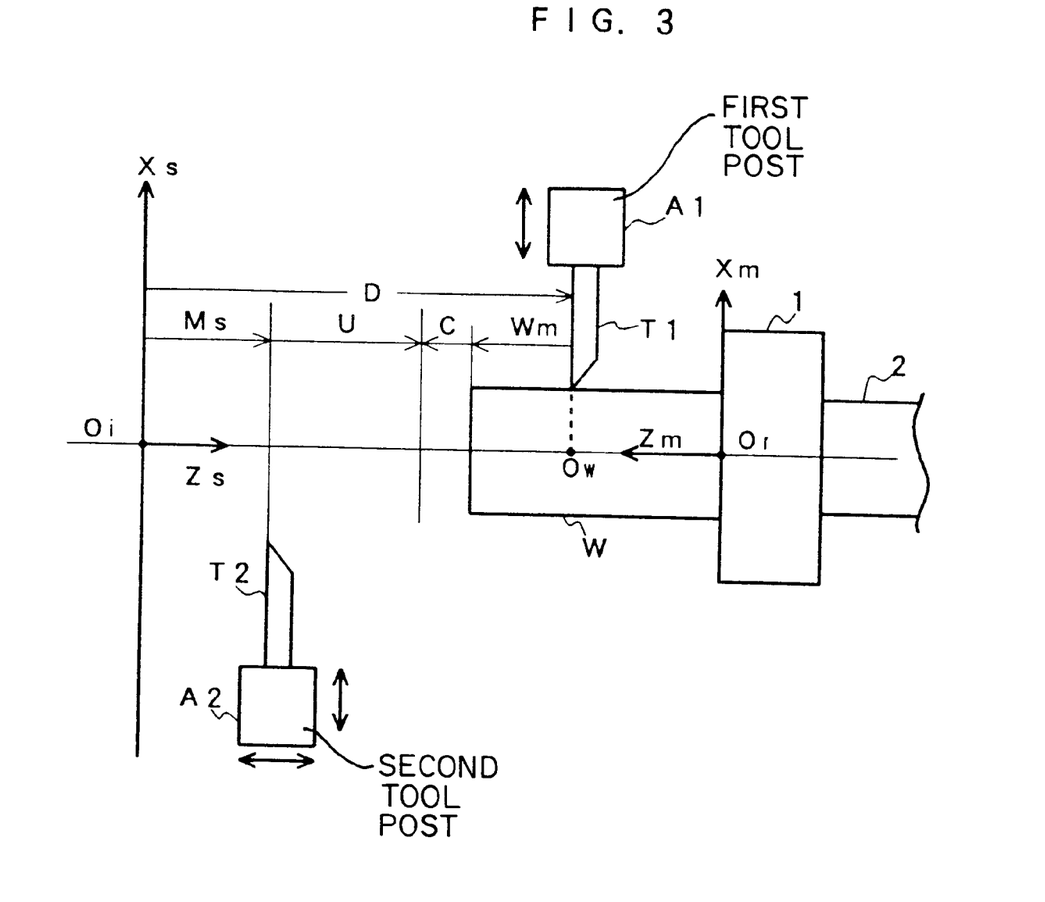
FIG. 3 is a schematic diagram showing the application of the method of the present invention to a lathe as a machine tool.

There is a case where the control is performed with one control system as a reference system and the other control system as a superimposing system, so that the motion of an axis of the one system is superimposed on the motion of an axis of the other system. For example, as shown in FIG. 3, a workpiece W attached to a spindle 2 by a chuck 1 is moved in the Z-axis direction (right and left direction in FIG. 3) and the workpiece W is machined by a tool T1 moving in the X-axis direction (upward and downward in FIG. 3), as well as by a tool T2 movable in the X-axis direction and the Z-axis direction.

In the above case, the motion of the tool T2 in the Z-axis direction needs to follow the motion of the workpiece W in the Z-axis direction. Therefore, the control system for the tool T1 is set as the reference system and the control system for the tool T2 is set as the superimposing system, and the motion command for the Z axis of the reference system is added to and superimposed on the motion command for the Z axis of the superimposing system to control the Z axis of the superimposing system. Since the motion of the workpiece W in the Z-axis direction, i.e. the motion in the Z-axis direction of the reference system, is superimposed on the motion of the tool T2 in the Z-axis direction, the tool T2 moves with the workpiece W and at the same time moves relatively to the workpiece W by an amount of the Z-axis motion command for the superimposing system. As a result the workpiece W can be machined by the tool T2 as commanded by the superimposing system. As a method for such superimposition, a value of the motion command for the Z axis of the reference system (a value distributed to the Z axis), which has been subjected to the acceleration/deceleration processing, is added to a value of the motion command for the Z axis of the superimposing system, which has been subjected to the acceleration/deceleration processing, as shown in FIG. 2, so that the servomotor for the Z axis of the superimposing system is controlled to be driven based on the superimposed value. In this case, the superimposing control is started and terminated in a state where both the reference system and the superimposing system are stopped.

This is because, if the superimposing control is started during the movement of the reference system, the superimposition value for the superimposed axis is not subjected to acceleration/deceleration processing and the motion command value for the reference axis is directly added to cause rapid acceleration of the superimposed axis, so that shock or vibration occurs or an alarm is issued due to an excessive increase of a position deviation. To explain this with reference to the example of FIG. 3, if the motion of the workpiece W is added to the Z-axis movement of the tool T2 of the superimposing system during the movement of the workpiece W, no acceleration/deceleration processing is performed on the superimposing motion command for the tool T2 and the velocity of the workpiece W is simply superimposed to cause rapid acceleration, so that shock or vibration occurs. Therefore, in the case where machining is to be carried out by the two control systems with a sequence of non-superimposing control, superimposing control and non-superimposing control, machining programs for the reference and superimposing systems are first individually executed in a non-superimposing mode, then executed in a superimposing mode after waiting until both motions of the two control systems are completed, and executed again in a non-superimposing mode after the respective machining programs for the superimposing mode are terminated.

However, each time the superimposing control is started or terminated, one of the two control systems has to wait until a machining program of the other control system is completed, to rise a problem that a machining time and thus a machining cycle are prolonged.

To solve the problem, a method may be employed in which the motion command value before subjection to the acceleration/deceleration processing for the reference system, is added to the motion command value before subjection to the acceleration/deceleration processing for the superimposing system, and then the obtained value is subjected to the acceleration/deceleration processing. This method is, however, disadvantageous in that a path error of the superimposed axis occurs unless the values of time constants of the acceleration/deceleration processing for the reference axis and the superimposed axis are the same or so close to each other within a certain range.

SUMMARY OF THE INVENTION

An object of the present invention is to provide a superimposing control method in which it is not necessary to wait until the reference system and the superimposing systems stop and the superimposing control can be started and terminated without causing the path error of the superimposed axis.

A superimposing control method of the present invention comprises the step of: performing acceleration/deceleration processing on a motion command value distributed for a first axis in a first control system from a numerical control device, to obtain an accelerated/decelerated motion command value for the first axis; performing acceleration/deceleration processing on a motion command value distributed for a second axis in a second control system from the numerical control device, to obtain an accelerated/decelerated motion command value for the second axis; performing acceleration/deceleration processing on the motion command value distributed for the first axis from the numerical control device, separately from the acceleration/deceleration processing for the first axis and the acceleration/deceleration processing for the second axis, and adding the obtained motion command value to be superimposed on the accelerated/ decelerated motion command value for the second axis, when a superimposition command is inputted; and moving the second axis based on the superimposed motion command value.

When the superimposition command is input, the above superimposing process is carried out by positioning the second axis at a desired position in a coordinate system of the first control system based on a command provided by a machining program for the second control system.

DETAILED DESCRIPTION OF THE INVENTION

Figure 1:
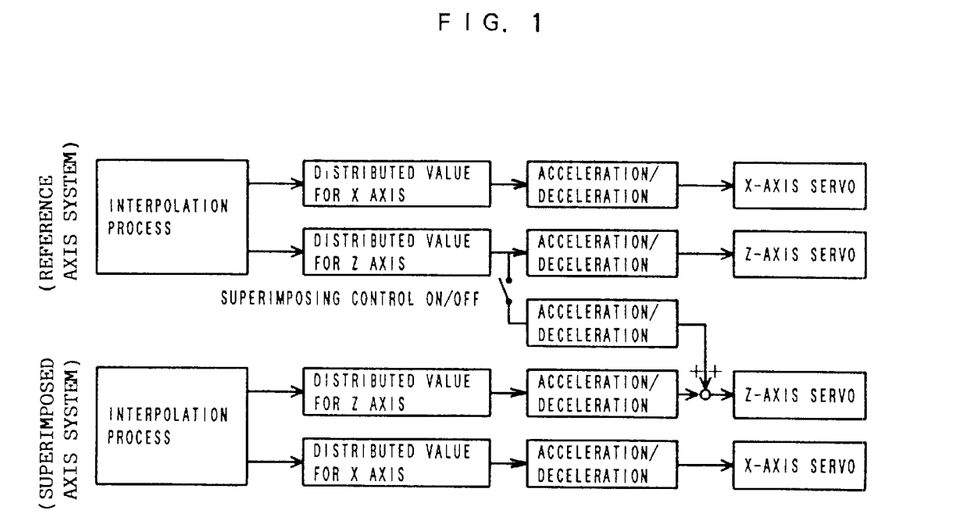
FIG. 1 is a block diagram showing the principle of a superimposing control method of the present invention.

Referring first to FIG. 1, the principle of a superimposing control method of the present invention will be explained. The method of the present invention differs from the conventional method shown in FIG. 2 in the following respect. In the conventional method, the motion command value distributed to the Z axis of the reference system is subjected to acceleration/deceleration processing, and a thus obtained command value to be output to the Z-axis motor is superimposed on the command value for the Z axis of the superimposing system. According to the present invention, by contrast, an acceleration/deceleration processing section for a superimposing process is provided separately from acceleration/deceleration processing sections associated with the reference and superimposing systems, the motion command value distributed to the Z axis of the reference system is subjected to acceleration/deceleration processing at the acceleration/deceleration processing section dedicated for the superimposing process, and the command value obtained in this manner is added to, and thus superimposed on, the motion command value for the motor for the Z axis of the superimposed axis.

During movement of the Z axis of the reference system, for example, while the Z axis is moving at a predetermined velocity after acceleration, if a superimposition command is input, the movement value distributed to be inputted to the Z axis of the reference system is subjected to acceleration/deceleration processing at the acceleration/deceleration processing section for the superimposition and then added to the motion command value for the Z axis of the superimposing system. Consequently, at the start of the superimposition, the velocity of the Z axis of the reference system is not directly added to the motion command value for the Z axis of the superimposing system, but the Z axis of the superimposing system is gradually accelerated, and when the acceleration process by the acceleration/deceleration processing section for the superimposition is completed, the velocity of the Z axis of the reference system is added in its entirety to the motion command value for the Z axis of the superimposing system. Also when the superimposition is terminated, the motion command value in the acceleration/deceleration processing section is gradually output to thereby gradually reduce the superimposition value, and finally the velocity superimposed becomes "0". As a result, when the superimposition is started or terminated, the movement of the Z axis of the superimposing system does not undergo rapid acceleration or rapid deceleration, whereby the superimposition can be smoothly started and terminated. It is also possible to match the acceleration/deceleration time constant of the acceleration/deceleration processing section for the superimposition with that of the Z axis of the reference system independently of the superimposing system, so that no path error of the superimposed axis occurs.

Figure 4:
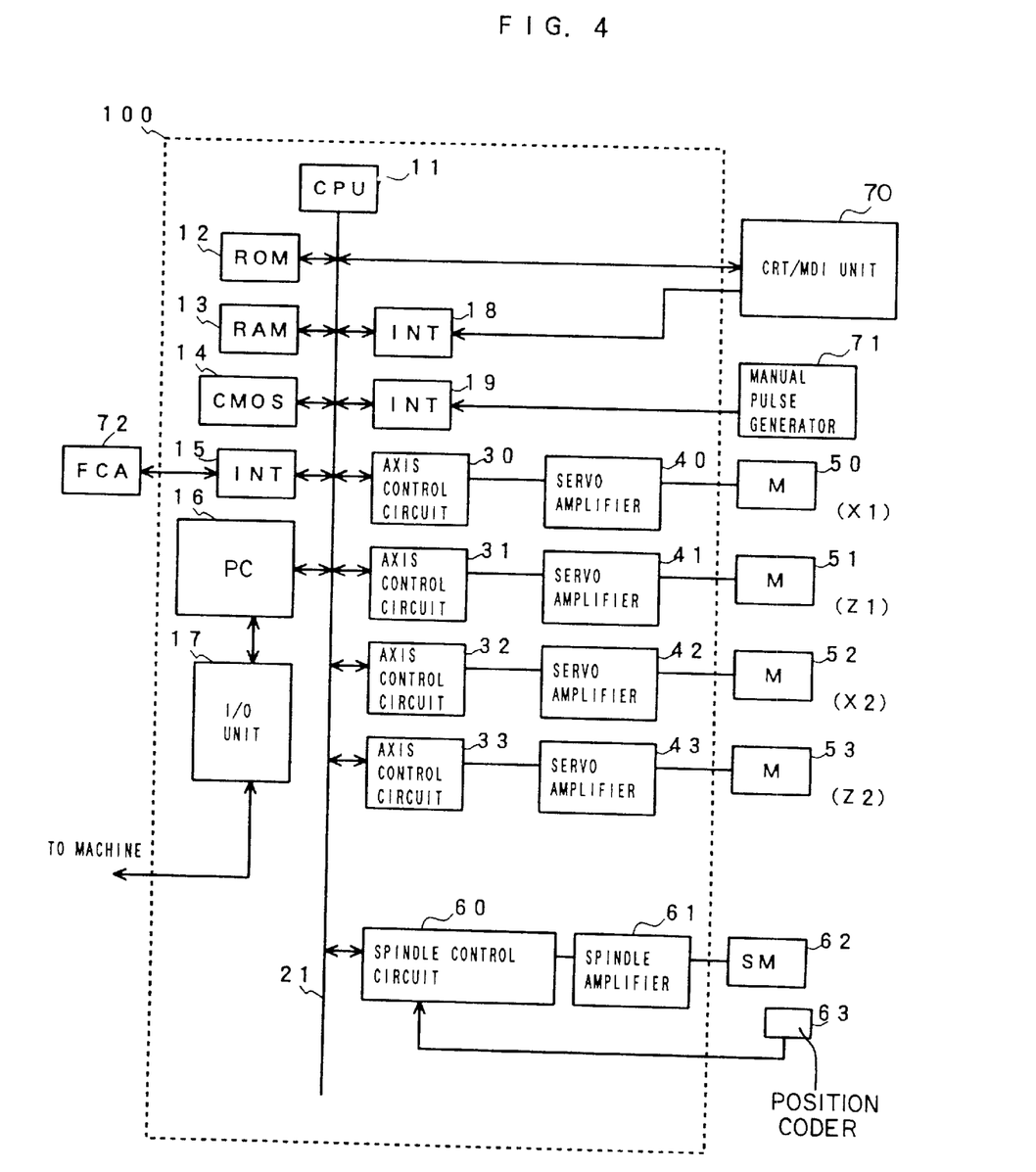
FIG. 4 is a block diagram showing a principal part of a numerical control device for carrying out the method of the present invention.

FIG. 4 is a block diagram of a numerical control device 100 for carrying out a method according to one embodiment of the present invention. The numerical control device 100 controls a lathe as a machine tool, which has two control systems each comprising two, X and Y axes, as shown in FIG. 3.

A processor 11 (CPU) of the numerical control device 100 reads via a bus 21 system programs stored in a ROM 12, and generally controls the numerical control device 100 according to the system programs. A RAM 13 temporarily stores calculation data, display data, various data inputted by an operator through a CRT/MDI unit 70. A CMOS memory 14 is a nonvolatile memory which is backed up by a battery, not shown, to retain data stored therein even when the power supply to the numerical control device 100 is cut off, and stores machining programs read via an interface 15 or inputted through the CRT/MDI unit 70. In the ROM 12, various system programs are written in advance for carrying out editing mode processing necessary for creating and editing the machining programs and processing for automatic operation.

The interface 15 is provided for an external device to be connected to the numerical control device 100, and an external device 72 such as a floppy cassette adapter is connected to the interface 15. A machining program or the like are read from the external device 72, and also the machining program edited in the numerical control device 100 can be stored in a floppy cassette, etc. via the external device 72.

A PC (programmable controller) 16 controls auxiliary devices of the machine tool, e.g., actuators such as a robot hand for changing tools, in accordance with sequence programs stored in the numerical control device 100. Specifically, in accordance with M, S and T functions specified by a machining program, the PC 16 performs conversion based on the sequence programs to obtain signals necessary for the auxiliary device side, and outputs the signals to the auxiliary device side via an I/O unit 17. According to the output signals, the auxiliary devices, e.g., various actuators, are operated. Also, the PC 16 receives signals from various switches on a control panel installed in the main body of the machine tool, processes the signals, and transfers the processed signals to the processor 11.

The CRT/MDI unit 70 is a manual data input device equipped with a display, a keyboard, etc., and an interface 18 receives commands and data from the keyboard of the CRT/MDI unit 70 and transfers the same to the processor 11. An interface 19 is connected to a manual pulse generator 71 and receives pulses therefrom. The manual pulse generator 71 is provided in the control panel and is used to position a tool with precision through control of the individual axes by means of distribution pulses generated by manual operation.

Axis control circuits 30 to 33, which are associated with two pairs of X and Z axes for moving a tool or a workpiece, are supplied with motion command values for corresponding axes from the processor 11 and output the commands to respective servo amplifiers 40 to 43. On receiving these commands, the servo amplifiers 40 to 43 drive servomotors 50 to 53 associated with the respective axes. Position and velocity detectors are built into each of the servomotors 50 to 53 associated with the respective axes, and position and velocity feedback signals are fed back to the axis control circuits 30 to 33 from the corresponding position and velocity detectors, so that the positions and the velocities are subjected to feedback control. In FIG. 4, illustration of the feedbacks of the position and velocity signals is omitted. The axis control circuit 30, the servo amplifier 40 and the servomotor 50 constitute a driving control system for the X axis of a first control system, and the axis control circuit 31, the servo amplifier 41 and the servomotor 51 constitute a driving control system for the Z axis of the first control system. Similarly, the axis control circuit 32, the servo amplifier 42 and the servomotor 52 constitute a driving control system for the X axis of a second control system, and the axis control circuit 33, the servo amplifier 43 and the servomotor 53 constitute a driving control system for the Z axis of the second control system.

A spindle control circuit 60 is supplied with a spindle rotation command and outputs a spindle velocity signal to a spindle amplifier 61. On receiving the spindle velocity signal, the spindle amplifier 61 rotates a spindle motor 62 at the commanded rotational speed. A position coder 63 is coupled to the spindle motor 62 by gears, a belt or the like, and outputs feedback pulses in synchronism with rotation of the spindle. The feedback pulses are fed back to the spindle control circuit 60 for velocity control.

Referring now to FIG. 3, the following description is made on the case for carrying out the present invention using a lathe as a machine tool having first and second tool posts A1 and A2 controlled by the numerical control device 100. A workpiece W, which is an object to be machined, is attached to the chuck 1 mounted on the spindle 2. The workpiece W is machined with the tools T1 and T2 attached to the first and second tool posts A1 and A2, respectively, and the spindle 2 is driven by the spindle motor 62 to rotate the workpiece W. The spindle 2 is also driven by the Z-axis servomotor 51 of the first control system so that it may be moved in the Z-axis direction in alignment with the axis of rotation thereof, to thereby move the workpiece W in the Z-axis direction. The first tool post A1 is driven by the X-axis servomotor 50 of the first control system so that it may be moved in the X-axis direction perpendicular to the Z-axis direction. In this embodiment, the first control system constitutes the control system for a reference system. The second tool post A2 is driven by the servomotors 52 and 53 of the second control system in the X- and Z-axis directions, and the second control system constitutes the control system for a superimposing system. The workpiece W can be machined by the reference and superimposing systems independently of each other, and also can be machined simultaneously by the tools T1 and T2 by superimposing the motion of the reference system on the motion of the superimposing system.

When superimposing operation is started, it is necessary that a position on a reference axis for the start of superimposition be determined and that the tool T2 of the superimposing system be moved to this position. A method for such positioning is described below.

It is assumed that the origin Ow of a machine coordinate system of the reference system is coincident with the axial center point on the distal end face of the chuck 1, and that the origin Ow of a work coordinate system of the reference system is coincident with a point on the Z axis at which the Z axis and a vertical line extending from the tip of the tool T1 meet. It is also assumed that the Z-axis coordinate of the end face of the workpiece W in the work coordinate system is Wm, and that the Z-axis coordinate of a current position of the tip of the tool T2 in a machine coordinate system (origin: Oi) of the superimposing system is Ms. A position in the work coordinate system of the reference system where superimposition is to be started is spaced at a distance of C on the Z axis from the current position Wm of the workpiece W in the work coordinate system of the reference system. Symbol D represents the distance between the origin Oi of the machine coordinate system of the superimposing system and the origin Ow of the work coordinate system of the reference system. Then, a movement value U for which the second tool post A2 is to be moved for superimposition is given by equation (1) below.

$$U=D-Ms-(Wm+C) \qquad (1)$$

In cases where the work coordinate system of the reference system and the machine coordinate system of the superimposing system are in an opposite relationship as shown in FIG. 3, the movement value U is calculated according to equation (1) above, but in the case where the two coordinate systems are directed in the same direction, the movement value is calculated according equation (2) below.

$$U=D-Ms+(Wm+C) \qquad (2)$$

In FIG. 3, the position for superimposition is located at a distance of C from the end face of the workpiece W in the positive direction of the Z axis of the work coordinate system just for simplicity of illustration; in cases where the position for superimposition is located closer to the origin of the work coordinate system than the end face of the workpiece W, C in the above equations (1) and (2) takes a negative value.

According to the present invention, the following commands are prepared as a superimposition start command, a superimposition termination command, and a command format for specifying the position for superimposition.

Superimposition Start Command: G126 Pa Pb

Superimposition Termination Command: G127 Pb

Command for Superimposition Position: G128 Pc

Symbol P represents an axis name (X, Y, Z), and a and b represent control system numbers. The superimposition start command "G126 Pa Pb" indicates the superimposition of Pb on Pa. The superimposition termination command "G127 Pb" specifies a superimposed axis of which the superimposition is to be terminated, in cooperation with the code "G127". The command "G128 Pc" specifying the position for superimposition in the work coordinate system demands that a rapid feed for positioning be effected up to a position which is spaced at a distance of c from the current position on an axis specified by P in the work coordinate system of the reference system.

Assuming that, in the embodiment shown in FIGS. 3 and 4, the reference system and the superimposing system, which are the first and second control systems, respectively, are represented by "1" and "2", respectively, then the superimposition start command, the superimposition termination command, and the command for superimposition position are set as follows:

G126 Z2 Z1
G127 Z1
G128 Zc

The superimposition start command, the superimposition termination command and the command for superimposition position are specified in a machining program for the superimposing system, and need to be programmed in such a manner that the superimposition start command "G126 Pa Pb" is followed by the command "G128 Pc" for superimposition position.

Figure 5:
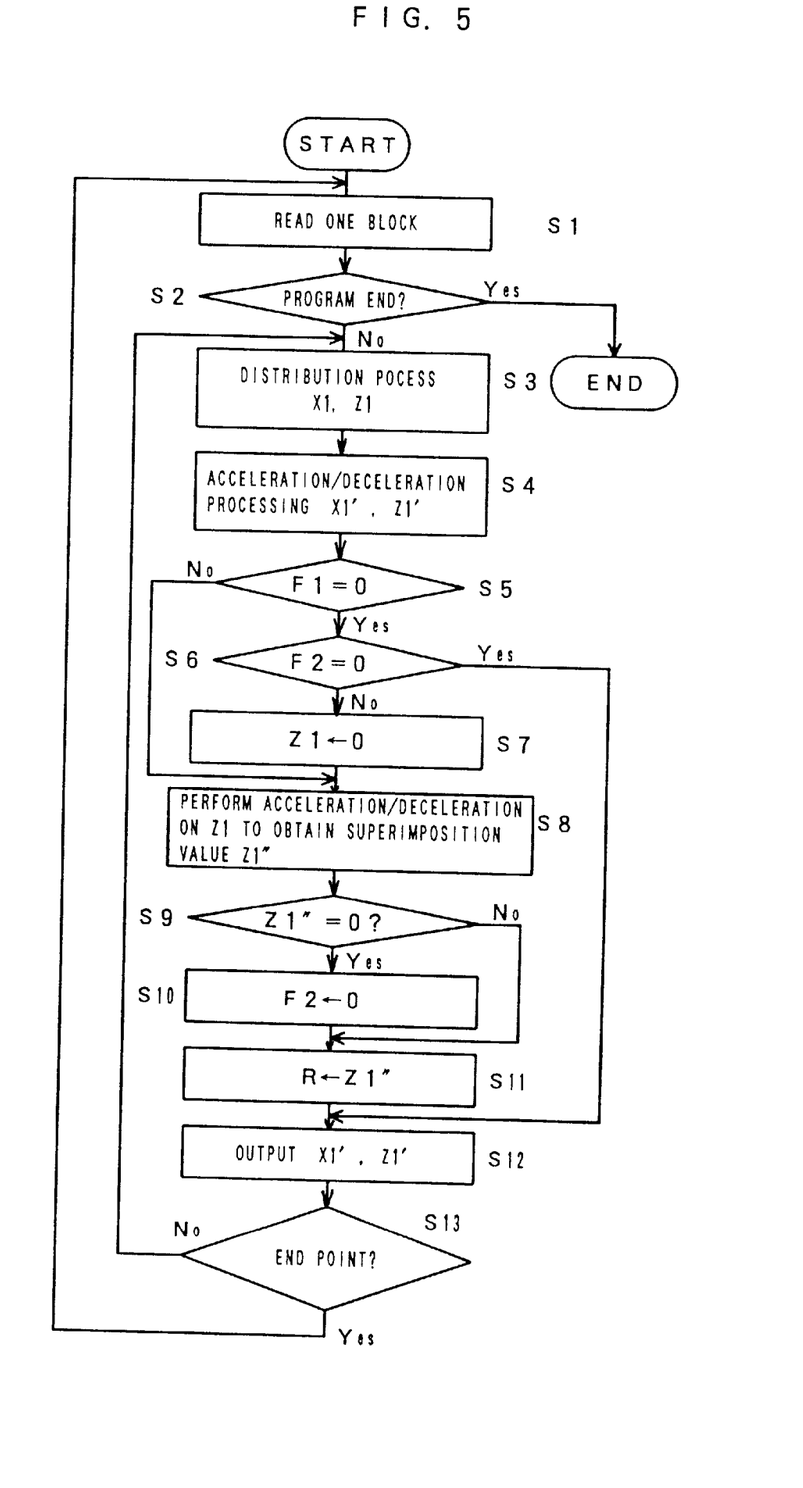
FIG. 5 is a flowchart showing a process for a reference system according to one embodiment of the present invention.
Figure 6:
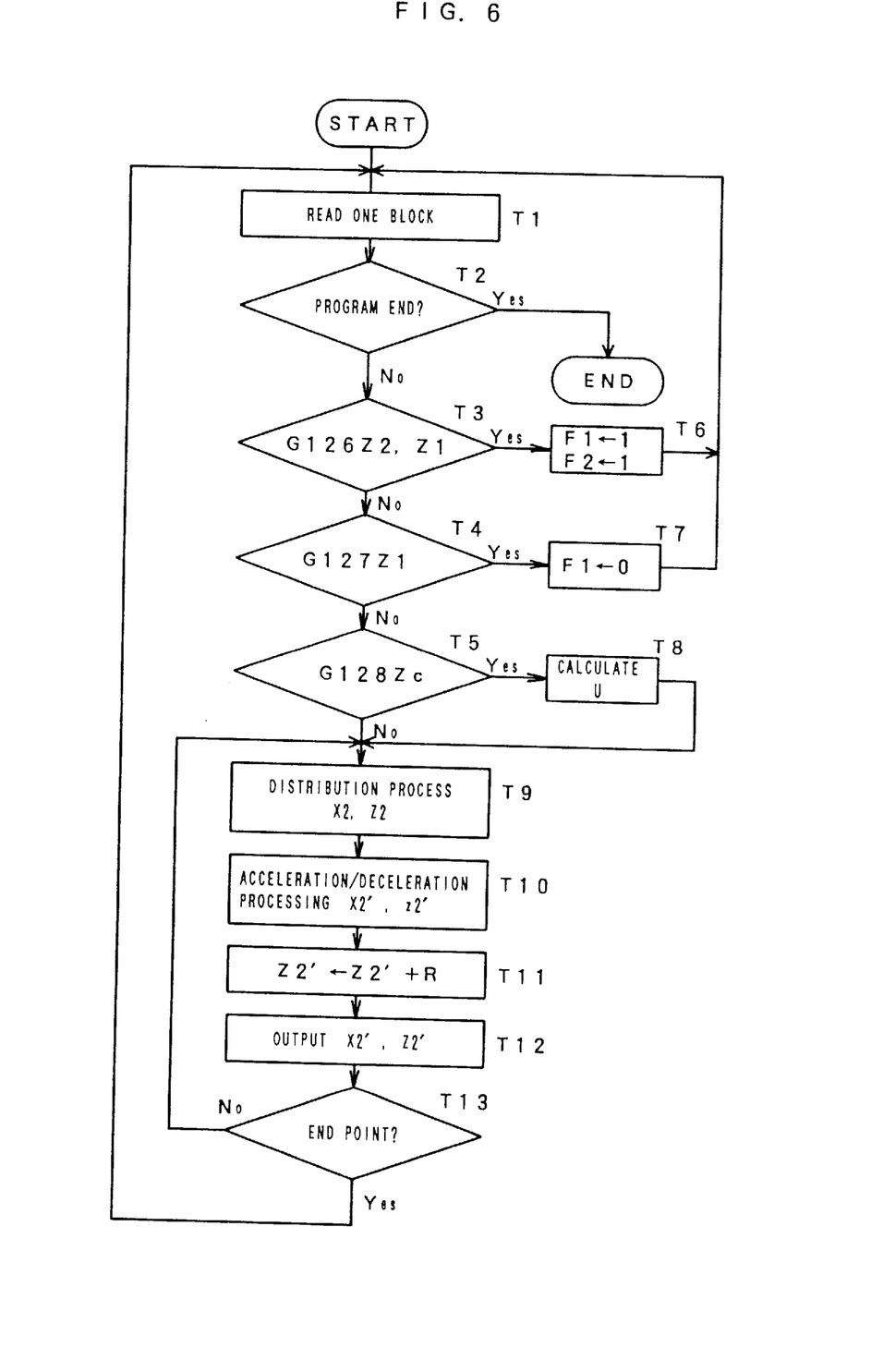
FIG. 6 is a flowchart showing a process for a superimposing system according to the embodiment.

FIGS. 5 and 6 are flowcharts showing processes for the reference system and the superimposing system, respectively, executed by the processor 11 of the numerical control device 100.

The process for the reference system will be explained first. One block is read from a machining program for the reference system (Step S1). If the command included in this block is not program end (Step S2), a distribution process for distributing motion command values to X1 and Z1 axes is performed based on the motion command specified in the block, to obtain distributed movement values x1 and z1 for the X1 and Z1 axes, respectively, and acceleration/deceleration processing is performed on the distributed movement values x1 and z1 to obtain accelerated/decelerated motion command values x1' and z1' which have been subjected to the acceleration/deceleration processing (Steps S3, S4). The acceleration/deceleration processing is identical with that employed in conventional methods. In the case of linear acceleration/deceleration processing, for example, registers of which the number is determined by the acceleration/deceleration time constant are prepared. Each time a distributed movement value is obtained (in each distribution cycle), values stored in the registers are shifted to the respective next registers while the obtained distributed command value is stored in the head register, the values stored in the individual registers are added together, and the sum obtained is divided by the number of the registers, the result being output.

Subsequently, it is determined whether or not each of flags F1 and F2, which are set to "1" by a superimposition command (as described later), is "0" (Steps S5, S6). If the superimposition is not under execution, then the flags F1 and F2 are "0"; in this case, the flow proceeds to Step S12 wherein the accelerated/decelerated motion command values x1' and z1' for the respective axes (X1, Z1), which were obtained in Step S4 and subjected to the acceleration/deceleration processing, are output to the corresponding axis control circuits 30 and 31, to drive the servomotors 50 and 51 via the respective servo amplifiers 40 and 41, so that the tool post A1 and the workpiece W are moved so as to machine the workpiece W with the tool T1.

It is then determined whether or not the distribution of motion command values has progressed up to an end point specified by the block concerned (Step S13), and if the end point is not yet reached, the flow returns to Step S3 and the aforementioned process is repeated. The process of Steps S3 through S13 is executed in each distribution cycle and is illustrated briefly in the flowchart.

If it is judged in Step S13 that the end point is reached, the flow proceeds to Step S1 to read the next block, and the aforementioned process is repeatedly executed to machine the workpiece W with the tool T1. When the program end is read (Step S2), the operation is ended.

In the process for the superimposing system (see FIG. 6), on the other hand, first, one block is read from a machining program for the superimposing system (second control system) (Step T1), and it is determined whether or not the command in the block specifies program end (Step T2). If no program end is specified, it is determined whether the superimposition command code "G126" or the superimposition termination command code "G127" or the command code "G128" for movement to the superimposition position is specified or not (Steps T3–T5). If none of these commands is specified, a distribution process for distributing motion command values to X2 and Z2 axes is performed based on the movement value specified in the block concerned, to obtain distributed movement values x2 and z2 for the respective axes (Step T9), and acceleration/deceleration processing similar to that described above is performed on the distributed movement values x2 and z2 to obtain motion command values x2' and z2' for the respective axes (Step T10).

Then, a superimposition value z1" stored in a register R in Step S11, described later, is added to the motion command value z2' for the Z axis thus obtained by the acceleration/deceleration processing, and the sum obtained is used as a superimposed motion command value z2' (Step T11). The superimposed motion command value z2' is output to the axis control circuit 33 associated with the Z2 axis while the motion command value x2' obtained in Step T10 is output to the axis control circuit 32 associated with the X2 axis (Step T12), to thereby drive the servomotors 53 and 52 via the respective servo amplifiers 43 and 42, so that the second tool post A2 is moved in the X- and Z-axis directions so as to machine the workpiece W. While the superimposition is not under execution, the value in the register R is "0"; therefore, nothing is superimposed on the motion command value z2' for the Z axis, and the motion command value z2' obtained in Step T10 is eventually output.

The process (Steps T9 through T13) is repeated until an end point specified by the block concerned is reached, and when it is judged in Step T13 that the end point is reached, the flow returns to Step T1 to read the next block, and the aforementioned process is repeatedly executed.

If the command in the read block includes the superimposition start command code "G126 Z2 Z1" (Step T3), which indicates that the movement value of the Z1 axis of the reference system is to be superimposed on that of the Z2 axis, the flags F1 and F2 are individually set to "11" (Step T6), and the flow returns to Step T1, in which the next block is read. The command "G128 Zc" specifying the position for starting superimposition is described following the superimposition start command; therefore, when this command is read, the flow proceeds from Step T5 to Step T8 wherein a movement value U is calculated according to the aforementioned equation (1) (Step T8), based on the value Wm of the Z1 axis in the work coordinate system of the reference system which is obtained from the value stored in a current position register for integrating the distributed motion command values, the current value Ms of the Z2 axis in the machine coordinate system of the superimposing system, and the command value c. The flow then proceeds to Step T9 and the distribution process for the movement value U is executed at rapid feed velocity. In this case, since the motion command concerned is for the Z2 axis only, distribution of the motion command value to the Z2 axis is carried out, the aforementioned acceleration/deceleration processing is performed to obtain the motion command value z2' and the superimposition value z1" stored in the register R is added to the motion command value z2' to obtain the motion command value z2' which is then output to the superimposed axis control circuit 33. If the end point is not yet reached, the process of Steps T9 through T13 is repeatedly executed.

When movement by the commanded movement value U is completed and the end point is reached, the flow returns to Step T1 to read the next block, and the aforementioned process starting from Step T2 is executed. At the time when the Z2 axis of the superimposing system reaches the end point after moving for the commanded value U and at the same time the superimposition value z1" stored in the register R becomes constant (at the time when the superimposition value becomes constant upon completion of the acceleration in the acceleration/deceleration processing Step S8 for the superimposition), the Z2 axis is positioned at the commanded position. Specifically, with regard to the Z1 and Z2 axes which are the superimposing axis and the superimposed axis, respectively, the actual position of the Z1 axis of the reference system lags behind the integrated value of the distributed motion command values by an amount corresponding to the acceleration process in the acceleration/deceleration processing, and thus has a position deviation with respect to the integrated value of the distributed motion command values. Also in the case of subjecting the distributed motion command value for the Z1 axis to the acceleration/deceleration processing to be superimposed on the Z2 axis, the superimposition value added to the Z2 axis of the superimposing system lags behind the integrated value of the distributed motion command values input to the acceleration/deceleration processing, by an amount corresponding to the acceleration/deceleration processing. Thus, if the time constants of the two acceleration/deceleration processings are made the same, then the aforementioned two lags become equal to each other. Since the movement value U is calculated based on the value stored in the current position register for integrating the distributed motion command values, the Z2 axis to be superimposed can eventually be positioned at the commanded position in the work coordinate system of the reference system.

If the flags F1 and F2 are individually set to "1" by the superimposition start command in the process for the superimposing system (Steps T3, T6), the set value "1" of the flag F1 is detected in Step S5 of the process for the reference system. Then, based on the distributed command value z1 obtained in Step S3, acceleration/deceleration processing for superimposition is performed (this acceleration/deceleration processing is identical with that in Step S4 and is performed with the use of an identical time constant), to obtain a superimposition value z1" (Step S8). A determination is then made as to whether the superimposition value z1" equals "0" or not (Step S9), and if not, the superimposition value z1" is stored in the register R (Step S11 ). The superimposition value z1" thus stored in the register R is added to the accelerated/decelerated motion command value z2' for the Z2 axis of the superimposing system which value has been subjected to the acceleration/deceleration processing, in Step T11 of the process for the superimposing system, and the sum obtained is output to the corresponding axis control circuit 33. The accelerated/decelerated motion command values x1' and z1' for the X1 and Z1 axes, obtained in Step S4, are output to the respective axis control circuits 30 and 31 (Step S12), to drive the servomotors 50 and 51 via the respective servo amplifiers 40 and 41, whereby the tool post A1 and the workpiece W are moved so as to machine the workpiece W with the tool T1.

While the flag F1 remains at "1" thereafter, the process of Steps S3 to S5, S8, S9 and S11 to S13 is executed until the end point of the block concerned is reached. When the end point of the block is reached, the flow returns to Step S1, and if no program end is specified in the newly read block, the process of Steps S3 to S5, S8, S9 and S11 to S13 is executed until the end point of this block is reached.

In the superimposing system, the superimposition value z1" is added to the motion command value for the Z2 axis in Step T11, and the servomotor 53 associated with this axis is driven in accordance with the obtained sum. Accordingly, the tool T2 moves together with the workpiece W and at the same time moves as specified by the program for the superimposing system, with the result that the tool T2 makes a relative movement to the workpiece W as instructed by the program for the superimposing system. This makes it possible to machine the workpiece W with the tools T1 and T2 at the same time.

If it is judged in Step T4 of the process for the superimposing system that the superimposition termination command "G127 Pb"="G127 Z1" is specified, the flag F1 is set to "0" (Step T7). As a result, in the process for the reference system, the flow proceeds from Step S5 to Step S6 wherein it is determined whether or not the flag F2 equals "0". Since, in this case, the flag F2 has been set to "1", the flow proceeds to Step S7 to set the distributed command value z1 to "0", and the acceleration/deceleration processing is performed to obtain the superimposition value z1" (Step S8). The distributed command value z1 input to the acceleration/deceleration processing is "0"; therefore, the superimposition value z1" reduces, and finally becomes "0" when the set time constant (the number of distribution cycles equal to the number of registers used in the acceleration/deceleration processing) has elapsed. As a result, the superimposition value added to the superimposing system in Step T11 gradually reduces and finally becomes "0". On detecting the zero ("0") superimposition value z1" in Step S9, the flag F2 is set to "0" and the flow proceeds to Step S11. Since the flags F1 and F2 are both set to "0", the acceleration/deceleration processing for superimposition is not executed thereafter; instead, Step S12 is executed following Steps S5 and S6, and the motion command values x1' and z1' for the X1 and Z1 axes, obtained by subjecting the distributed movement values to the acceleration/deceleration processing, are output to the axis control circuits 30 and 31, respectively.

As described above, since the movement value for the Z1 axis is subjected to the acceleration/deceleration processing and then superimposed on the movement value for the Z2 axis, the Z2 axis does not undergo a sudden velocity change at the time of start or termination of the superimposition but is gradually accelerated or decelerated, and therefore, shock, vibration or the like due to rapid acceleration or rapid deceleration does not occur.

In the embodiment described above, the first and second control systems are set as the reference system and the superimposing system, respectively, and the Z1 axis of the reference system is set as the superimposing axis while the Z2 axis of the superimposing system is set as the superimposed axis. Since the superimposition start command "G126 Pa Pb" specifies the superimposing axis and the superimposed axis, when this command is read (Step T3), the superimposing axis and the superimposed axis may be stored in Step T6, a determination may be made in Step S5 as to whether or not there is a superimposing axis, and if a superimposing axis exists, the distributed motion command value for the stored superimposing axis is subjected to acceleration/deceleration processing (Step S8), and the superimposition value is stored in the register associated with the stored superimposed axis, in Step S11. Then, in Step T11, for all axes, superimposition values stored in the corresponding registers may be added to the respective motion command values which have been subjected to the acceleration/deceleration processing (the values stored in the registers associated with those axes which are not specified as the superimposed axis are "0") so that the sums obtained may be output.

Also, in the foregoing embodiment, the superimposing control is performed under the control of the machining program. Alternatively, the superimposition start/termination command may be a signal input via the PC, and the axis control may be commanded by an independent command system, for example, through axis control by the PC.

According to the present invention, the superimposition can be started and terminated without the need for making the two control systems for the superimposing and superimposed axes stop for adjustment of timing, whereby the machining cycle can be shortened. Further, the velocity of the superimposed axis does not undergo a sudden change when the superimposition is started or terminated, so that shock or vibration does not occur, permitting stable machining.

I claim:

1. A superimposing control method for a machine tool having a plurality of control systems operable independently of one another, and controlled by a numerical control device, in which a motion command value for a first axis in a first control system of said plurality of control systems is superimposed on a motion command value for a second axis in a second control system of said plurality of control systems, said method comprising the steps of:

performing first acceleration/deceleration processing on a first motion command value distributed for said first axis in said first control system from said numerical control device, to obtain a first accelerated/decelerated motion command value for said first axis;

driving a first servo motor in the first axis in the first control system in response to the first accelerated/decelerated motion command value;

performing second acceleration/deceleration processing, different from the first acceleration/deceleration processing, on the motion command value distributed for said first axis in said first control system to obtain a second accelerated/decelerated motion command value for said first axis, different from said first accelerated/decelerated motion command value for said first axis;

performing acceleration/deceleration processing on a motion command value distributed for said second axis in said second control system from said numerical control device, to obtain an accelerated/decelerated motion command value for said second axis;

adding the obtained accelerated/decelerated motion command value for said second axis to the obtained second accelerated/decelerated motion command value for said first axis when a superimposition command is inputted; and driving a second servo motor in the second axis in the second control system in response to the added accelerated/decelerated motion command values.

2. The superimposing control method according to claim 1, further comprising the steps of:

positioning a first tool at a desired position in response to said first servo motor; and positioning a second tool at a desired position in response to said second servo motor.

3. The superimposing control method according to claim 2, wherein said steps of positioning the first tool and positioning the second tool are executed independently.

4. The superimposing control method according to claim 3, wherein said steps of positioning the first tool and positioning the second tool are executed simultaneously.

5. A numerical control device to control a first machine tool in a first and a second axis, and a second machine tool in the first and second axis, comprising:

a reference axis system to output a first reference motion command value to control motion of the first machine tool in the first axis upon execution of corresponding first reference acceleration/deceleration processing, and to output a second reference motion command value to control motion of the first machine tool in the second axis upon execution of corresponding second reference acceleration/deceleration processing; and a superimposed axis system to output a first superimposed motion command value to control motion of the second machine tool in the first axis upon execution of corresponding second axis acceleration/deceleration processing, and to output a second superimposed motion command value to control motion of the second machine tool in the second axis upon execution of corresponding second acceleration/deceleration processing, wherein the second reference motion command value to control motion of the first machine tool in the second axis is subjected to corresponding third reference acceleration/deceleration processing, different from the second reference acceleration/deceleration processing, and the resulting value is added to the first superimposed motion command value upon execution of corresponding second axis acceleration/deceleration processing, to thereby control the first axis of the second machine tool.

6. The numerical control device according to claim 5, wherein the first machine tool is a lathe and the second machine tool is a lathe.

7. The numerical control device according to claim 5, wherein the first machine tool is positioned at a first desired position and the second machine tool is positioned at a second desired position independently of the first machine tool.

8. The superimposing control method according to claim 5, wherein the first machine tool is positioned at a first desired position and the second machine tool is positioned at a second desired position simultaneously with the first machine tool.

9. A control system for a machine tool having a plurality of control systems operable independently of one another, and controlled by a numerical control device, in which a motion command value for a first axis in a first control system of said plurality of control systems is superimposed on a motion command value for a second axis in a second control system of said plurality of control systems, said control system comprising:

means for performing first acceleration/deceleration processing on a first motion command value distributed for said first axis in said first control system from said numerical control device, to obtain a first accelerated/decelerated motion command value for said first axis;

means for driving a first servo motor in the first axis in the first control system in response to the first accelerated/decelerated motion command value;

means for performing second acceleration/deceleration processing, different from the first acceleration/deceleration processing, on the motion command value distributed for said first axis in said first control system to obtain a second accelerated/decelerated motion command value for said first axis, different from said first accelerated/decelerated motion command value for said first axis;

means for performing acceleration/deceleration processing on a motion command value distributed for said second axis in said second control system from said numerical control device, to obtain an accelerated/decelerated motion command value for said second axis;

means for adding the obtained accelerated/decelerated motion command value for said second axis to the obtained second accelerated/decelerated motion command value for said first axis when a superimposition command is inputted; and means for driving a second servo motor in the first axis in the second control system in response to the added accelerated/decelerated motion command values.

10. The control system according to claim 9, further comprising:

means for positioning a first tool at a desired position in response to said first servo motor; and means for positioning a second tool at a desired position in response to said second servo motor.

11. The numerical control device according to claim 9, wherein the first machine tool is positioned at a first desired position and the second machine tool is positioned at a second desired position independently of the first machine tool.

12. The superimposing control method according to claim 9, wherein the first machine tool is positioned at a first desired position and the second machine tool is positioned at a second desired position simultaneously with the first machine tool.

13. A numerical control device to simultaneously control a first machine tool and a second machine tool, comprising:

a reference system to output a reference motion command value to control motion of the first machine tool upon subsequent execution of a corresponding first reference acceleration/deceleration processing; and a superimposed system to output a superimposed motion command value to control motion of the second machine tool upon subsequent execution of a corresponding superimposed acceleration/deceleration processing, wherein the reference motion command value is subjected to corresponding second reference acceleration/deceleration processing, different from the first reference acceleration/deceleration processing, and the resulting value is added to the superimposed motion command value which has been subjected to corresponding subsequent superimposed acceleration/deceleration processing, to thereby control said second machine tool simultaneously with said first machine tool.

14. The numerical control device according to claim 13, wherein the first machine tool is a lathe and the second machine tool is a lathe.

15. The numerical control device according to claim 13, wherein the reference motion command is output from the reference system and the superimposed motion command is output from the superimposed system when motion of the first machine tool and the second machine tool are stopped.

16. The numerical control device according to claim 13, wherein the reference motion command is output from the reference system and the superimposed motion command is output from the superimposed system when motion of the first machine tool and the second machine tool are in motion.

17. The numerical control device according to claim 13, wherein the reference motion command is output from the reference system and the superimposed motion command is output from the superimposed system when the first machine tool is moving with constant velocity and the second machine tool is not in motion, such that the second machine tool is gradually accelerated or decelerated with reference to the first machine tool.

18. The numerical control device according to claim 13, wherein the reference motion command is output from the reference system and the superimposed motion command is output from the superimposed system when the first machine tool is in motion, such that an acceleration/deceleration time constant of the acceleration/deceleration for the superimposed system is matched with an acceleration/deceleration time constant of the acceleration/deceleration for the reference system.

19. The numerical control device according to claim 13, wherein the first machine tool is positioned at a first desired position and the second machine tool is positioned at a second desired position independently of the first machine tool.

20. The superimposing control method according to claim 13, wherein the first machine tool is positioned at a first desired position and the second machine tool is positioned at a second desired position simultaneously with the first machine tool.

* * * * *